United States Patent [19]
Olschewski et al.

[11] Patent Number: 4,645,474
[45] Date of Patent: Feb. 24, 1987

[54] SEALING DEVICE FOR BEARING BUSHINGS PARTICULARLY FOR UNIVERSAL JOINTS

[75] Inventors: Armin Olschewski, Schweinfurt; Bernhard Bauer, Hassfurt; Elisabeth Zirk, Dittelbrunn, all of Fed. Rep. of Germany

[73] Assignee: SKF GmbH, Schweinfurt, Fed. Rep. of Germany

[21] Appl. No.: 808,820

[22] Filed: Dec. 13, 1985

[30] Foreign Application Priority Data

Dec. 20, 1984 [DE] Fed. Rep. of Germany ... 8437288[U]

[51] Int. Cl.$^4$ .......................... F16C 33/78; F16D 3/41
[52] U.S. Cl. ..................................... 464/131; 277/152; 277/208; 384/486
[58] Field of Search ............. 277/50, 152, 189, 207 R, 277/208, 212 C; 384/477, 484, 485, 486; 464/11, 14, 128, 131

[56] References Cited

U.S. PATENT DOCUMENTS

| | | | |
|---|---|---|---|
| 2,027,078 | 1/1936 | Warner | 464/131 X |
| 2,773,366 | 12/1956 | Slaght | 464/14 X |
| 2,802,351 | 8/1957 | Anderson | 464/131 X |
| 2,996,901 | 8/1961 | Kleinschmidt | 464/131 |
| 3,592,022 | 7/1971 | Stokely | 464/131 |
| 4,312,547 | 1/1982 | Negele et al. | 384/486 |
| 4,440,401 | 4/1984 | Olschewski et al. | 464/131 X |

FOREIGN PATENT DOCUMENTS

| | | | |
|---|---|---|---|
| 566898 | 8/1960 | Belgium | 464/131 |
| 968837 | 9/1964 | United Kingdom | 464/131 |

Primary Examiner—Stuart S. Levy
Assistant Examiner—Daniel P. Stodola
Attorney, Agent, or Firm—Eugene E. Renz, Jr.

[57] ABSTRACT

A sealing device for bearing bushings, especially for universal joints including a cup-shaped bearing bushing overlying a universal joint pin comprising an inner sealing ring, a sheet metal part connected to the bearing bushing adapted to fix the inner sealing ring in place in an axial direction, and an outer sealing ring provided on a shoulder of the joint pin supported in the bearing bushing, the inner sealing ring has a retaining part between the rolling elements and the free end of a preferably radially oriented shank of the sheet metal part, which has one or more openings, which connect the spaces defined by the outer sealing ring, the inner sealing ring, and the sheet metal part to each other.

4 Claims, 1 Drawing Figure

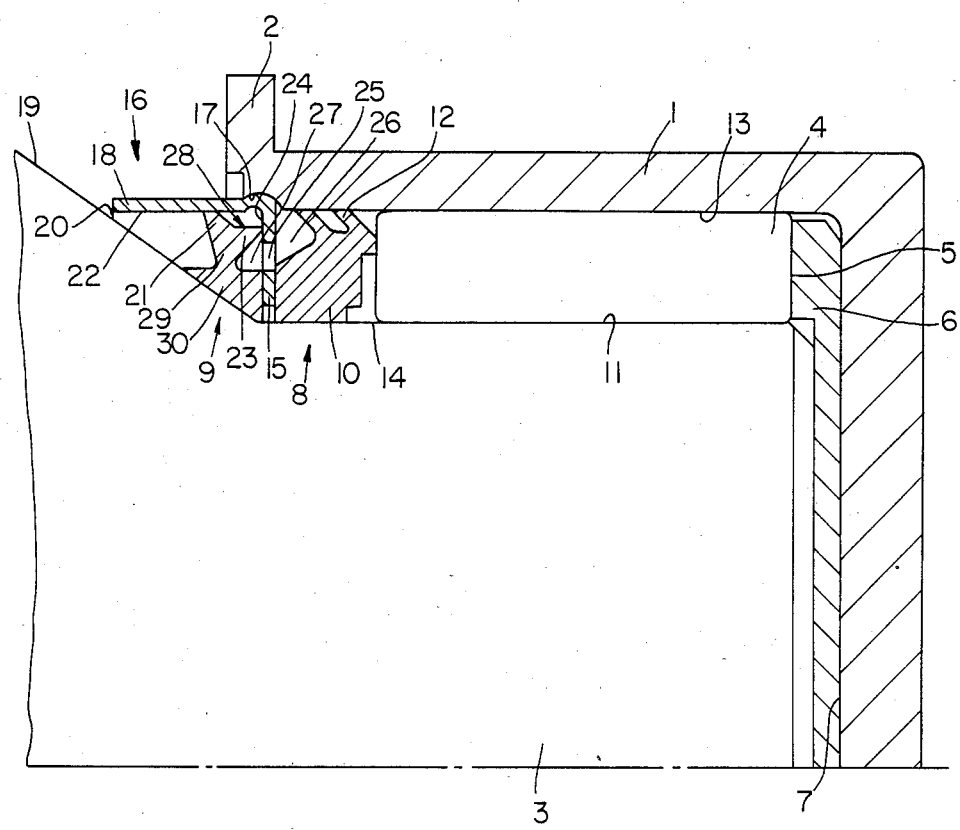

SEALING DEVICE FOR BEARING BUSHINGS PARTICULARLY FOR UNIVERSAL JOINTS

FIELD OF THE INVENTION

The present invention relates to improvements in sealing devices for bearing bushings particularly for universal joints comprising an inner sealing ring which is fixed in position in an axial direction by a sheet metal part secured to the bearing bushing and an outer sealing ring which is arranged on the shoulder of the machine part supported in the bearing bushing.

BACKGROUND OF THE INVENTION

Sealing arrangements for bearing bushings are not new per se. For example, U.S. Pat. No. 2,996,901 shows a seal for a cardan joint having inner and outer sealing rings wherein the inner sealing ring is held in place axially by a sheet metal member connected to the bearing bushing and wherein the outer sealing ring is located on the universal joint pin and contacts externally the sheet metal member. The prior sealing device described above has certain disadvantages and drawbacks. For example, it has been found that it is difficult to purge old grease from the bearing when it is desired to relubricate or regrease the bearing.

SUMMARY OF THE INVENTION

With the foregoing in mind, it is an object of the present invention to provide a sealing device of the general type described above comprising inner and outer sealing rings wherein the inner sealing ring is characterized by novel features of construction and arrangement which serves as a contact surface for the rolling elements and which also ensures that the bearing can be regreased easily when desired.

To this end, in accordance with the present invention, the inner sealing ring is formed with a retainer portion disposed between the rolling elements and the free end of a radially oriented shank portion of the sheet metal member. The shank portion of the sheet metal part has one or more ports or openings which connect the outer sealing ring, the inner sealing ring and the sheet metal member to each other. This provides an effective sealing arrangement which can be easily mounted.

In accordance with another feature of the present invention, the inner sealing ring is mounted on the universal joint pin and has a plurality of outwardly angled, circumferentially extending sealing lips which contact the inner bore surface of the bearing bushing whereby the sealing lips can be easily angled outwardly when the bearing is greased.

In accordance with still another feature of the present invention, the outer sealing ring has a section provided with sealing lips which is connected by way of a relatively narrow cross piece to the retaining member so they can elastically yield. In this fashion, the sealing lips can be more readily and easily raised from the sealing surface which they contact when it is desired to grease the bearing.

DESCRIPTION OF THE DRAWING

These and other objects of the present invention and the various features and details of the operation and construction thereof are hereinafter more fully set forth with reference to the accompanying drawing, wherein:

FIG. 1 is a cross-sectional view of a universal joint incorporating a seal arrangement in accordance with the present invention.

DESCRIPTION OF THE PREFERRED EMBODIMENT

Referring now to the drawing, reference numeral 1 shows a generally cup-shaped bearing bushing having an open side and a radially, outwardly directed flange 2 for mounting the unit axially in the eye of a fork (not shown). The bearing bushing overlies a universal joint pin 3. A plurality of cylindrical rolling elements 4 is mounted in the annular space between the bearing bushing and the universal joint pin which as illustrated roll with their axial end faces 5 confronting a disk 6 made of a low-friction material having good sliding characteristics. As illustrated, disk 6 is supported on the bottom wall 7 of the bearing bushing and serves to support the universal joint pin 3 axially.

A sealing device in accordance with the present invention is mounted adjacent the open end of the bearing bushing 1 and comprises broadly an inner sealing ring 8 and an outer sealing ring 9. As illustrated, inner sealing ring 8 has a body or retaining portion 10 which engages the outer peripheral surface 11 of the universal joint pin 3 and in the present instance has two outwardly angled sealing lips 12 which contact the inner peripheral bore surface 13 of the bearing bushing 1. The axial end face of the body portion 10 of the inner sealing ring confronting the axial ends of the rolling elements has a recess for a contact disk 14 which engages the rolling elements 4. Inner sealing ring 8 is held in place in the axial direction by a radially inwardly directed flange or shank 15 of a sheet metal retainer 16 which as illustrated is of generally L-shaped cross section. The sheet metal retainer 16 has an enlarged bulbous circumferentially extending corner section connecting the shank portion 15 and the axially directed shank portion 18 which engages in a recess 17 formed in the open end of the bearing bushing 1. As illustrated, the axially directed shank portion extends beyond the end of the bearing bushing. Note that the free end of the axially directed shank portion 18 is slightly spaced from a conical section 19 of the universal joint pin 3 to form a sealing gap 20.

As illustrated, the outer sealing ring 9 is mounted on the conical surface 19 of universal joint pin 3. The outer sealing ring includes a radially outwardly directed sealing lip 21 which contacts the bore surface 22 of the axially directed shank portion 18 of the sheet metal retainer 16 and a second axially directed sealing lip 23 which contacts the outer radial face of the radially, inwardly directed shank portion 15 of the sheet metal retainer 16. The shank portion 15 of sheet metal retainer 16 is provided with one or more axially directed circumferentially spaced openings 25 which, as illustrated, connect an annular space 26 defined by the inner sealing ring 8 and the sheet metal retainer 9 to an annular space 27 defined by the outer sealing ring 9 and the sheet metal retainer 16. In this manner, when it is desired to regrease the bearing, which is usually done via a lubrication fitting disposed on the blank wall of the bearing bushing, old grease is forced through the gap between the sealing lips 12 and bore surface 13 and then passes through openings 25 and past sealing lips 21, 23 to the outside. Section 28 of outer sealing ring 9 carrying the sealing lips 21, 23 is connected to retaining part 30 by way of a narrow, circumferentially extending cross piece 29 and is angled outwardly so that the sealing lips 21, 23 can be briefly raised from their contact surfaces 22, 24 to permit the lubricant purging described above.

Even though a particular embodiment of the present invention has been illustrated and described above, it is to be understood that the invention is not limited and that changes and modifications may be made therein within the scope of the following claims.

What is claimed is:

1. A sealing system for bearing bushings (1) of cup-shape form having a pin (3) mounted on rolling elements (4) disposed in the space between the pin (3) and bushing (1) therein comprising an inner sealing ring (8) mounted on the pin (3) confronting one axial end of the rolling elements and having at least one outwardly directed sealing lip (12) engaging the bore surface (13) of the bushing, an outer sealing ring (9) mounted on the pin adjacent the inner sealing ring, a rigid retaining member (16) connected to the bushing adapted to fix the inner sealing ring in place in an axial direction and including a radially directed shank portion (15) disposed between the inner and outer sealing rings, said outer sealing ring having flexible lips (21, 23) engaging the retaining member, means defining chambers (26, 27) formed by the sealing rings and retaining member and communicating through at least one connecting port (25) in the shank portion of the retaining member, said chambers defining with said lips a continuous labyrinth or passage upon lubricant pressure build-up to permit purging the rolling element space when desired.

2. A sealing system according to claim 1, wherein the inner sealing ring (8) is arranged so that it is in contact with the pin (3) and has outwardly angled sealing lips (12) in contact with the bore surface (13) of the bearing bushing.

3. A sealing system according to claim 1, wherein said outer sealing ring (9) has a first sealing lip (21) in contact with the bore surface (22) of the sheet metal part (16), and a second sealing lip (23) in contact with the surface (24) of the radially oriented shank (15) facing the outer sealing ring.

4. A sealing system according to claim 1, wherein a section (28) of the outer sealing ring (9) having the sealing lips (21, 23) is connected by way of a narrow, circumferential cross piece (29) to the retaining part (30) of the sealing ring (9).

* * * * *